(12) United States Patent
Worthman et al.

(10) Patent No.: US 8,950,460 B2
(45) Date of Patent: Feb. 10, 2015

(54) RETRACTABLE AWNING WITH LIGHTING IN AN EXTENDED POSITION

(71) Applicant: Lippert Components, Inc., Goshen, IN (US)

(72) Inventors: Brian M. Worthman, Goshen, IN (US); Christopher S. Greer, Leesburg, IN (US); Zachary Inbody, Elkhart, IN (US); Jeffrey K. Albrecht, Goshen, IN (US)

(73) Assignee: Lippert Components, Inc., Elkhart, IN (US)

( * ) Notice: Subject to any disclaimer, the term of this patent is extended or adjusted under 35 U.S.C. 154(b) by 51 days.

(21) Appl. No.: 13/683,490

(22) Filed: Nov. 21, 2012

(65) Prior Publication Data

US 2014/0137381 A1    May 22, 2014

(51) Int. Cl.
*E04F 10/06* (2006.01)
*B60P 3/34* (2006.01)

(52) U.S. Cl.
CPC .............. *B60P 3/343* (2013.01); *E04F 10/0614* (2013.01); *E04F 10/0625* (2013.01); *E04F 10/0666* (2013.01)
USPC .............................................. 160/10; 160/67

(58) Field of Classification Search
USPC ............... 160/10, 67, 127; 135/88.12; 439/21
IPC ....................... E04F 10/0611, 10/0666, 10/0625
See application file for complete search history.

(56) References Cited

U.S. PATENT DOCUMENTS

| | | | | |
|---|---|---|---|---|
| 3,217,137 A * | 11/1965 | Weitzner | ........................ | 219/201 |
| 3,439,307 A * | 4/1969 | Ruscher | .......................... | 439/21 |
| 3,860,312 A * | 1/1975 | Gordon, Jr. | ..................... | 439/31 |
| 4,194,550 A * | 3/1980 | Hopper | ........................ | 160/121.1 |
| 5,148,849 A * | 9/1992 | Faludy | .............................. | 160/67 |
| 5,704,792 A * | 1/1998 | Sobhani | .......................... | 439/21 |
| 5,908,179 A * | 6/1999 | Fimbres | ........................... | 248/51 |
| 6,494,246 B1 * | 12/2002 | Blevins | ............................ | 160/67 |
| 7,049,761 B2 * | 5/2006 | Timmermans et al. | ........ | 315/246 |
| 7,117,565 B2 * | 10/2006 | Brutsaert | .......................... | 16/386 |
| 7,723,939 B2 * | 5/2010 | Carmen, Jr. | ..................... | 318/466 |
| 7,971,622 B2 * | 7/2011 | Trionfetti | ......................... | 160/24 |
| 2012/0073624 A1 * | 3/2012 | Nocito et al. | .................. | 136/245 |
| 2013/0235558 A1 * | 9/2013 | Zhou | ................................ | 362/96 |

* cited by examiner

*Primary Examiner* — David Purol
(74) *Attorney, Agent, or Firm* — Barnes & Thornburg LLP

(57) ABSTRACT

A retractable awning with is moveable between an extended position where the awning is deployed for use and a retracted position where the awning is stowed out of use. The awning includes a light source mounted on a roller tube, with the light source being exposed to a living area beneath the awning when the awning is in the extended position. A contact assembly provides electrical power to the light source, with the contact assembly comprising engaging rotatable and stationary segments.

8 Claims, 8 Drawing Sheets

RETRACTABLE AWNING WITH LIGHTING IN AN EXTENDED POSITION

BACKGROUND OF THE INVENTION

This invention relates to retractable awnings, such as for recreational vehicles, and in particular to a retractable awning, where, in an extended position, light is provided to illuminate a living space beneath the awning canopy.

When the awning is extended, it is typically desirable to have lighting beneath the awning. To that end, various types of lighting can be deployed beneath the awning, and in one instance in the prior art, in U.S. Pat. No. 5,148,849, a retractable awning is disclosed which has a light source installed in a large slot in the roller tube upon which the awning canopy is rolled. Electricity is provided to the light source via an electrical cord that must be plugged into an outlet in a conventional fashion. The cord must be plugged for use, and then unplugged for retraction of the awning.

SUMMARY OF THE INVENTION

The invention is directed to a retractable awning which is moveable between an extended position where the awning is deployed for use and a retracted position where the awning is stowed out of use, with the awning including a flexible canopy and a roller tube upon which the canopy is rolled in the retracted position. The improvement of the invention is directed to an elongated light source which is mounted on the roller tube and positioned to illuminate an area beneath the flexible canopy when the awning is in the extended position. A contact assembly provides electrical power to the light source, with the contact assembly comprising a rotatable segment fixed for rotation with the roller tube and a stationery segment mounted to engage the rotatable segment.

In the preferred form of the invention, the elongated light source comprises a plurality of LEDs connected in series. The LEDs are located in an elongated housing, such as a clear tubing or rope, which is generally weather impervious. Preferably the light source is located in a slot in a roller tube.

The rotatable segment that rotates with the roller tube comprises a contact disk which is fixed to an axle for the roller tube. The stationery segment includes at least one conductor which bears on the contact disk. Preferably, the contact disk includes a pair of spaced contact rings and the stationery segment includes a corresponding pair of conductors, with each conductor bearing on one of the contact rings.

BRIEF DESCRIPTION OF THE DRAWING FIGURES

The invention is described in greater detail in the following description of examples embodying the best mode of the invention, taken in conjunction with the drawing figures, in which.

DESCRIPTION OF EXAMPLES EMBODYING THE BEST MODE OF THE INVENTION

Figure 1:
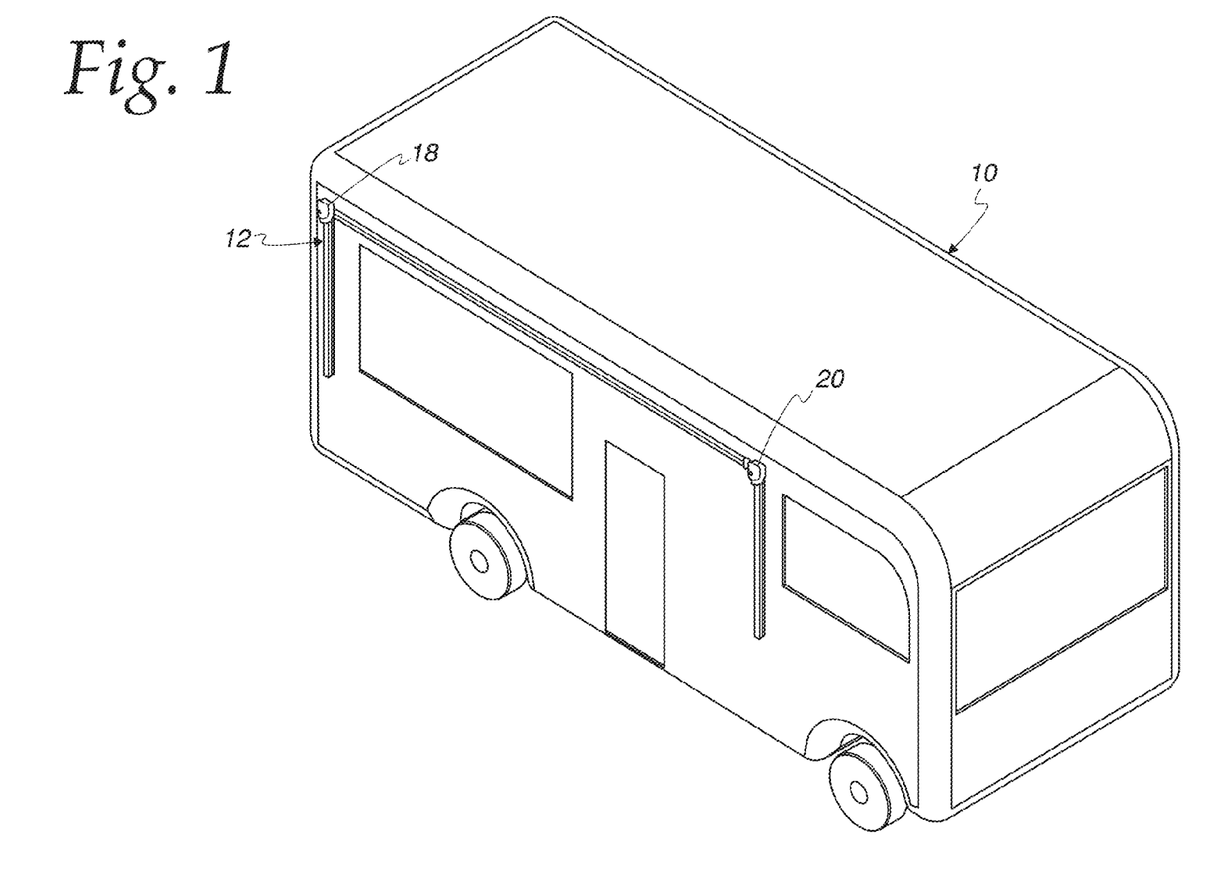
FIG. 1 is an isometric view of a recreational vehicle employing a retractable awing according to the invention, when in the retracted position.
Figure 2:
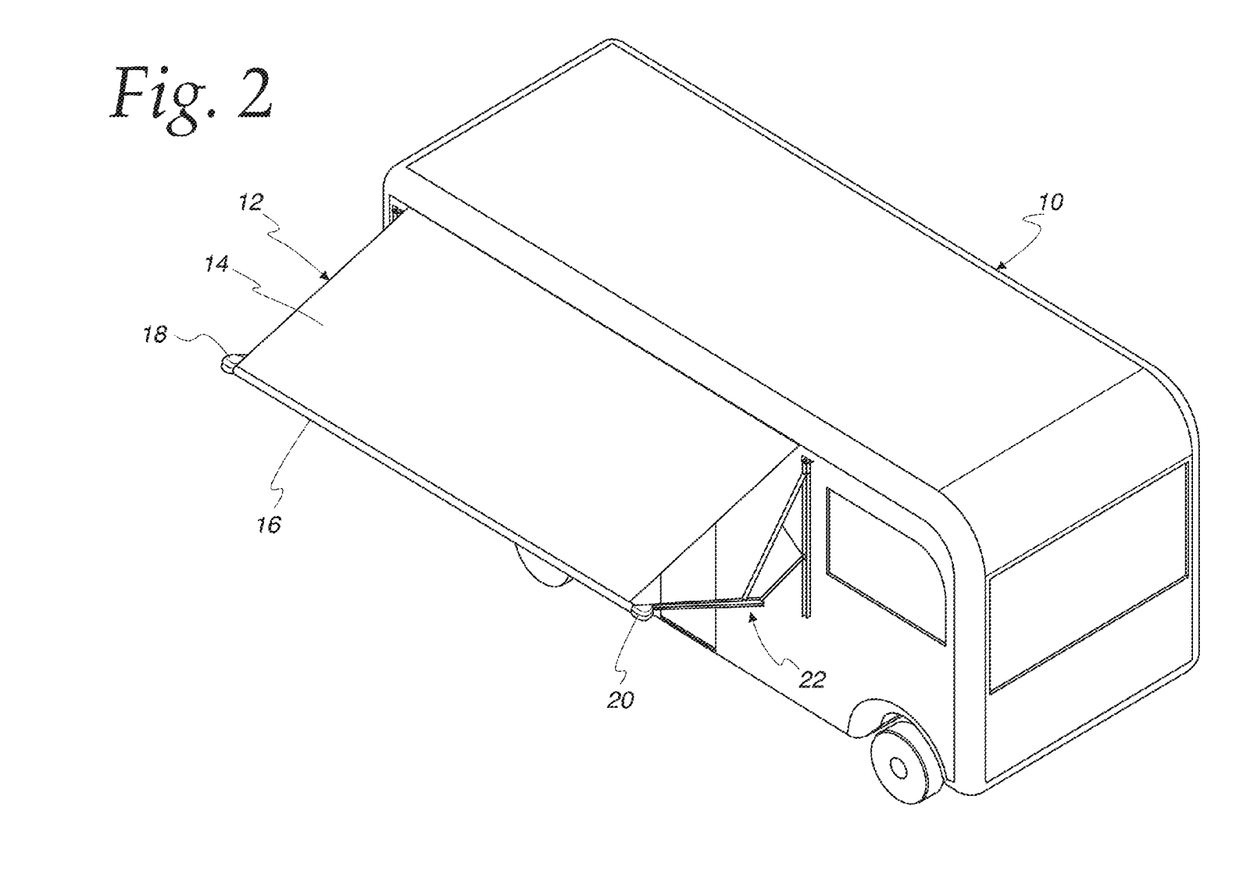
FIG. 2 is a view similar to FIG. 1, but with the awning in the extended position.

FIGS. 1 and 2 illustrate, schematically, a recreational vehicle 10 employing an awning 12 according to the invention, with the awning shown in FIG. 1 in the retracted position, and shown in the extended position in FIG. 2. As is typical, the awning 12 includes a flexible canopy 14 and a roller tube 16 upon which the canopy is rolled in the retracted position, as shown in FIG. 1. The roller tube 16 is mounted in opposite heads 18 and 20 connected at the end of a support system 22. The support system 22 preferably is that of copending U.S. patent application Ser. No. 13/523,599, filed Jun. 14, 2012, the disclosure of which is incorporated herein by reference, although the support system may be any system for extending and retracting an awning, and forms no part of the present invention.

The roller tube 16 is shown in greater detail in FIGS. 3-7. The roller tube 16 includes a series of elongated strengthening ribs 24 extending the length thereof, and three equally spaced circumferential slots 26, 28 and 30. The slots 26 and 28 are slots in which the flexible canopy 14 is installed in a conventional manner, leaving the slot 30 vacant. The slot 30 is that location in which the elongated light source of the invention is installed, as explained in greater detail below.

Figure 3:
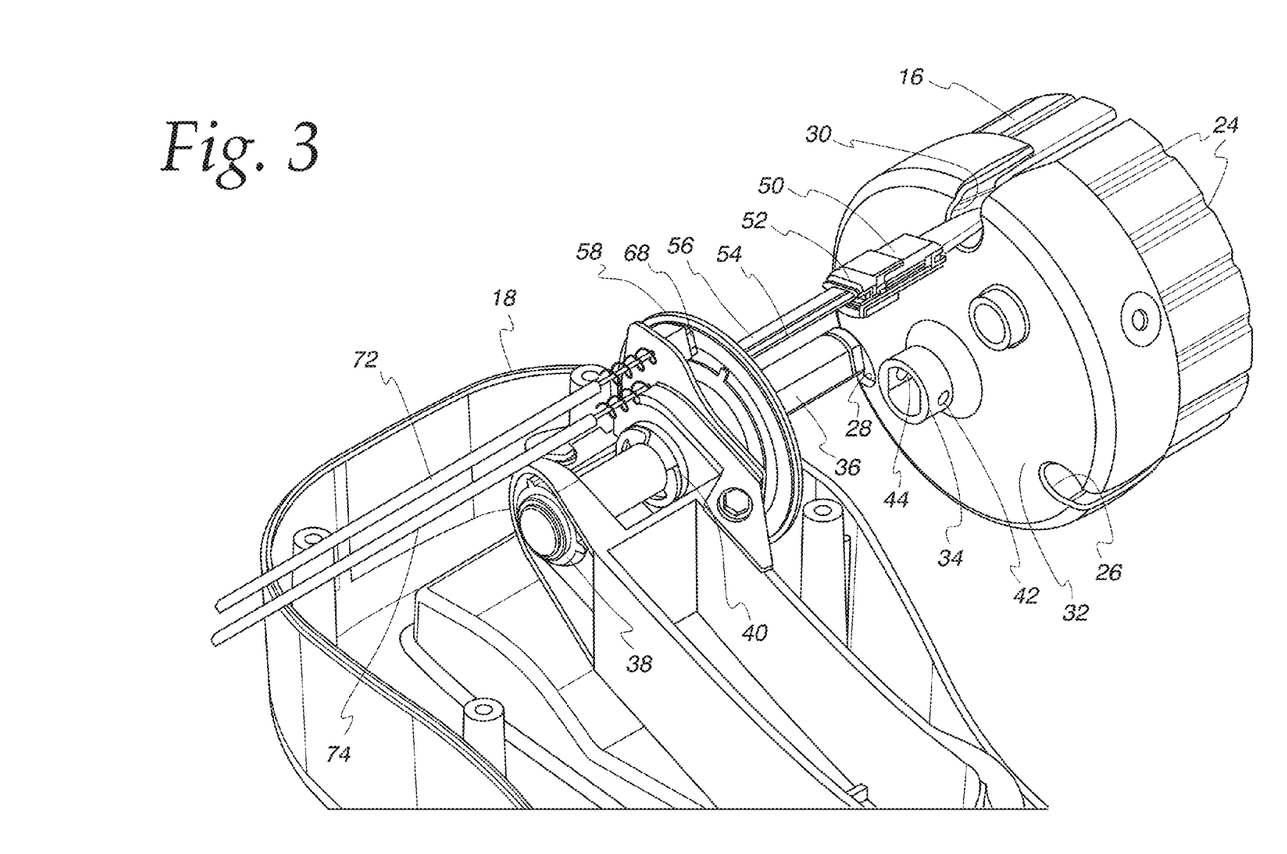
FIG. 3 is an enlarged isometric view of one end of the awning roller tube showing its connection to a head at the end of an awning arm, and with part of the head removed to illustrate detail.
Figure 4:
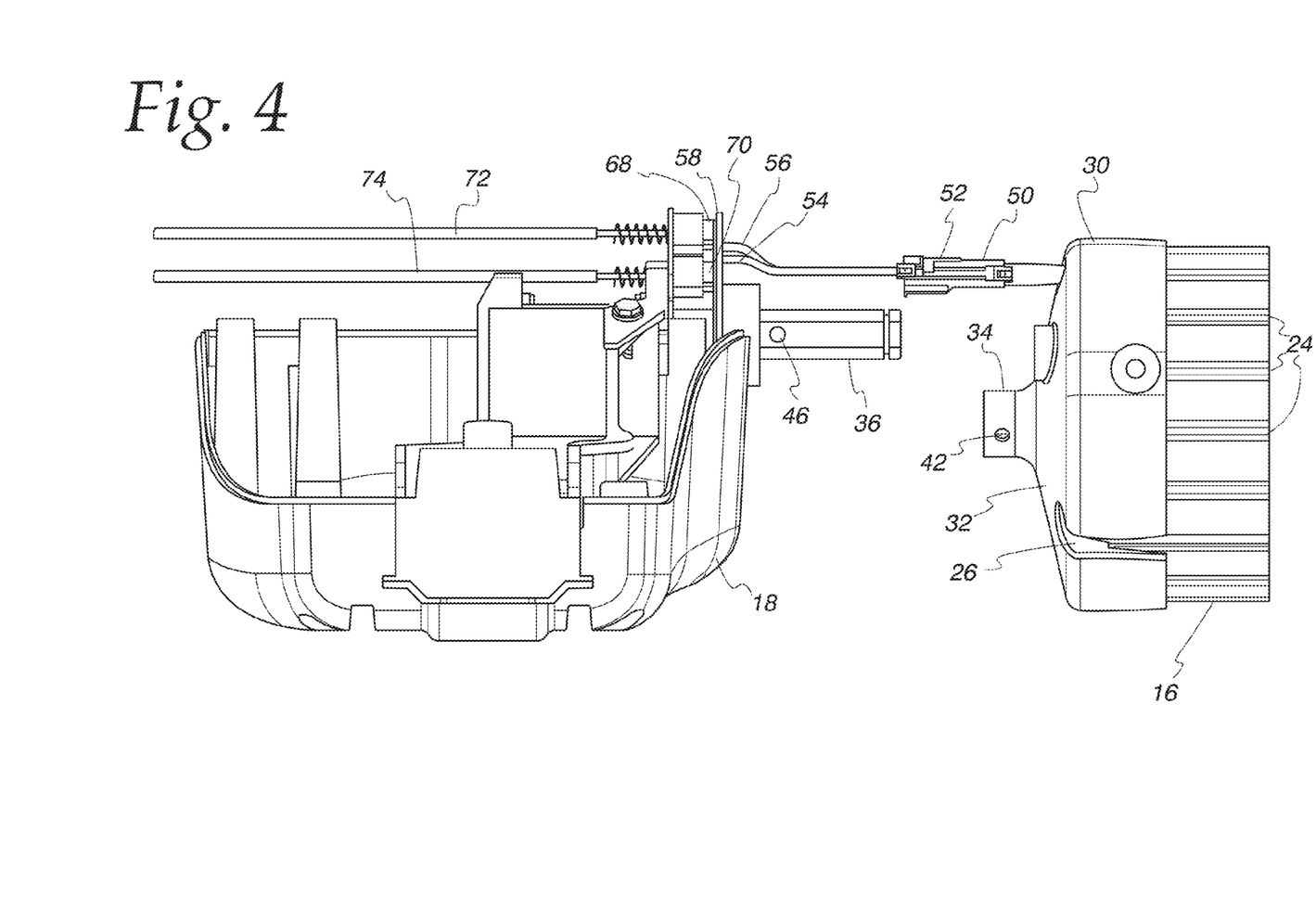
FIG. 4 is an elevational view of the structure shown in FIG. 3.
Figure 5:
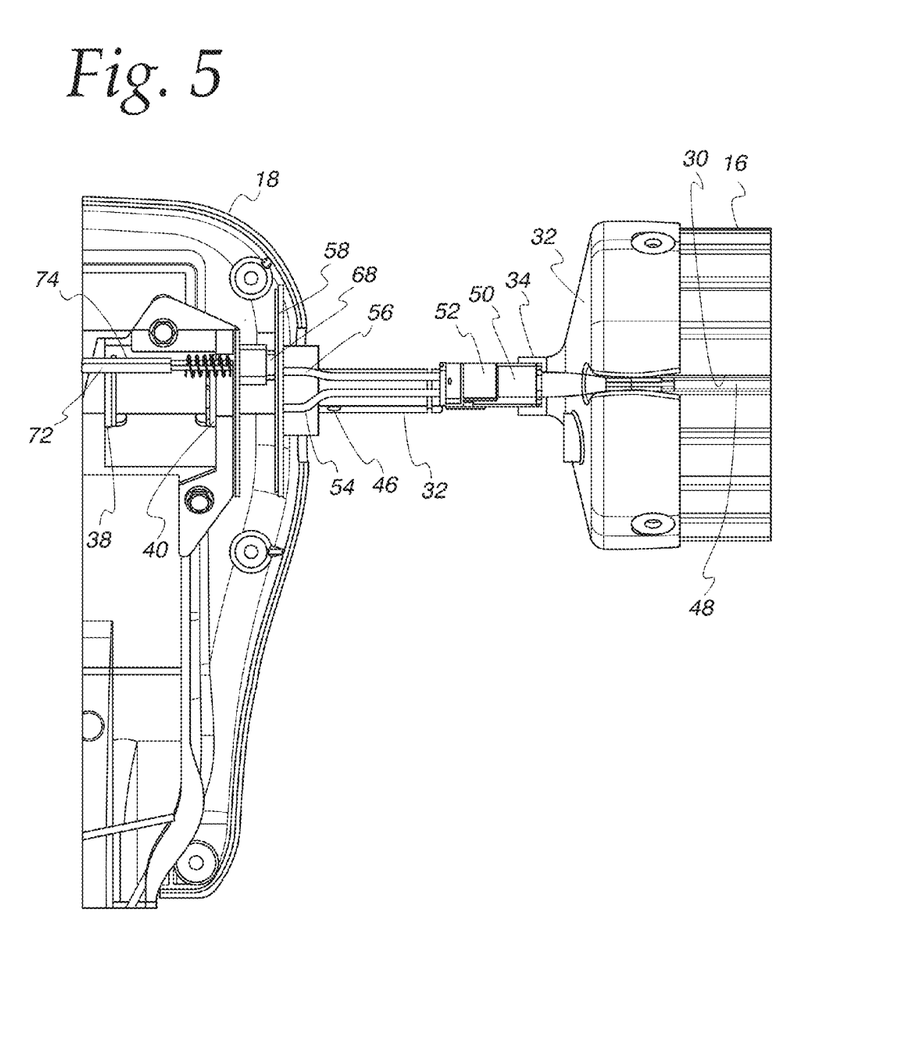
FIG. 5 is a top plan view of the structure shown in FIG. 3.

The roller tube 16 includes a cap 32 and an axial coupler 34. The coupler 34 is shaped to engage an axle 36 mounted for rotation in the head 18 by means of bearings 38 and 40. As illustrated, the axle 36, where it connects with the coupler 34, is shaped to conform to the internal configuration of the axial coupler 34 so that the roller tube 16 and axle 36 rotate as a unit. The axle 36 may be held in the axial coupler 34 by means of a pin or the like (not illustrated) extending through holes 42 and 44 in the axial coupler 34 and a hole 46 (FIG. 4) in the axle 36.

Figure 6:
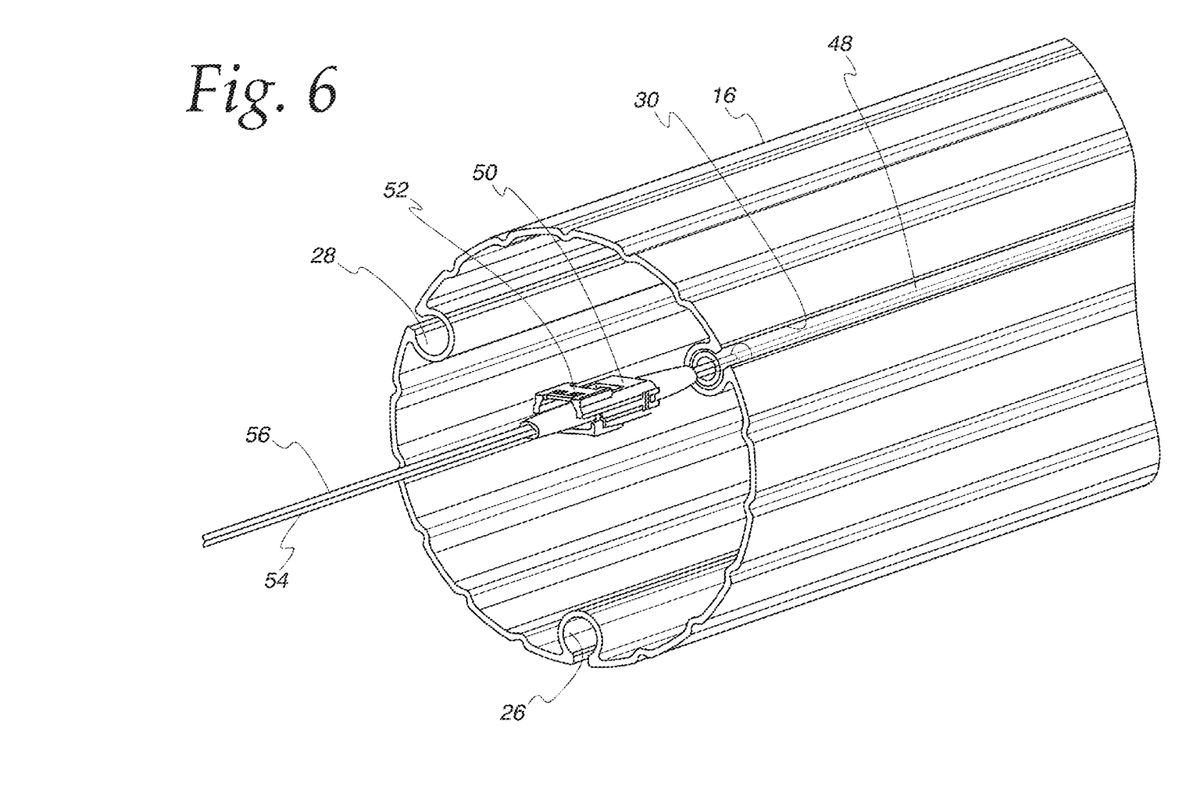
FIG. 6 is a an enlarged view of an awning roller tube according to the invention, with a light source installed therein.
Figure 7:
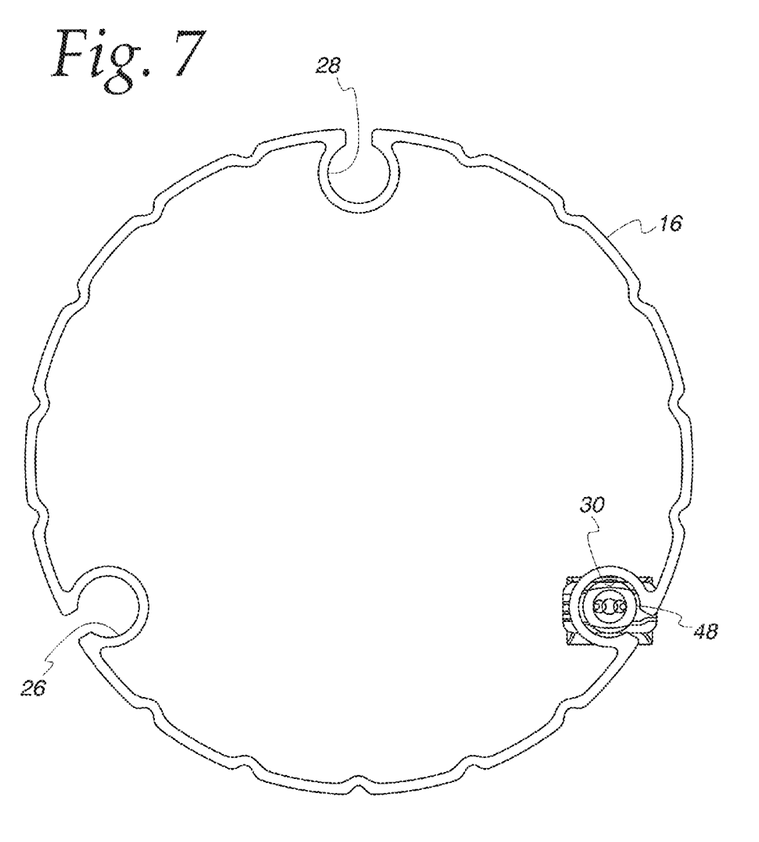
FIG. 7 is a further enlarged end view of the awning roller tube of FIG. 6, from the opposite end.

A light source 48, in the form of an elongated strip of LEDs in a rope fashion, is installed in the slot 30. The light source 48 may be conventional in that it is composed of a plurality of LEDs connected in series, with the LEDs located in a solid plastic housing or rope. The light source 48 extends for substantially the length of the roller tube 16, or two or more light sources can be connected one following the other to occupy the length of the roller tube. When the awning 12 is in the extended position shown in FIG. 2, the flexible canopy 14 occupies the slots 26 and 28. The light source 48, in the slot 30, extends beneath the flexible canopy 14 to illuminate the area beneath the flexible canopy 14.

Figure 8:
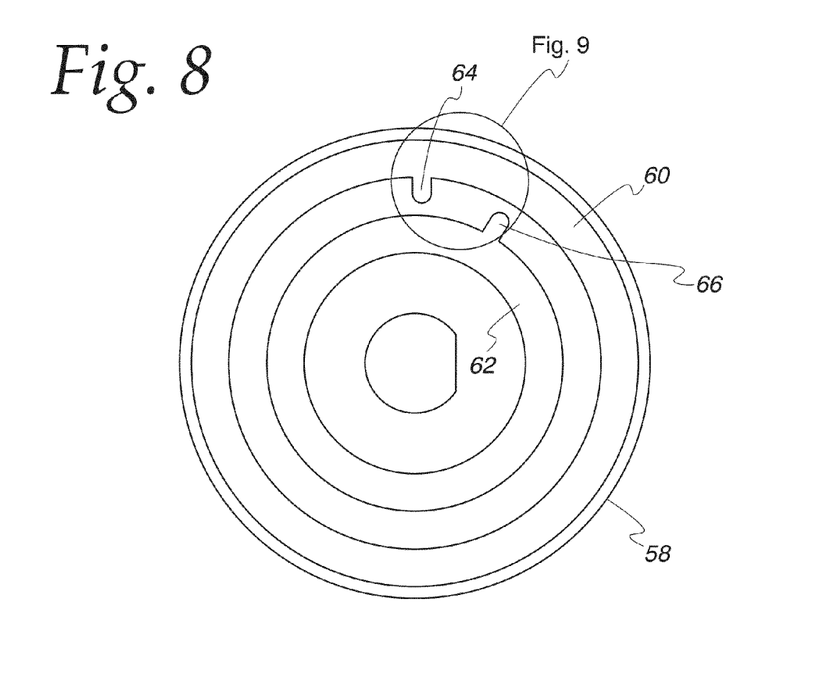
FIG. 8 is an elevational view of the electrical contact disk which rotates with the roller tube.
Figure 9:
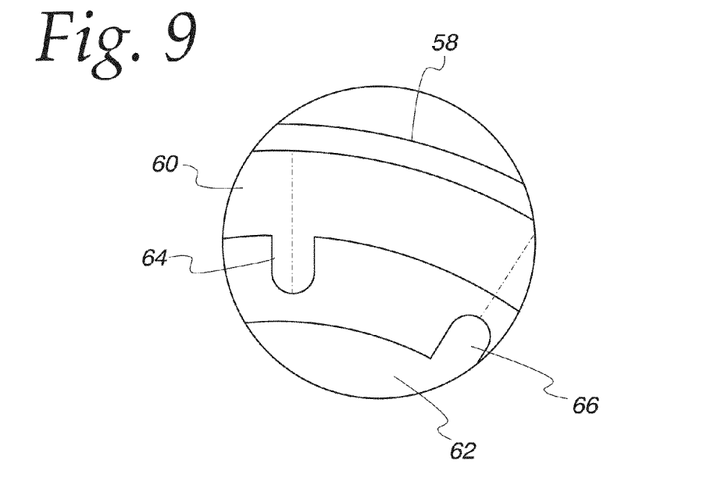
FIG. 9 is an enlarged section taken at 9-9 of FIG. 8.

For powering the light source 48 with electricity, the light source 48 includes a coupler 50 engaged in a second coupler 52. Wires 54 and 56 lead from the coupler 52 to a contact disk 58 mounted for rotation on the axle 36. As best shown in FIGS. 8 and 9, the contact disk 58 includes a pair of spaced, concentric contact rings 60 and 62. The rings 60 and 62 are formed of conductive material, such as copper, while the contact disk 58 is a non-conductive material, such as plastic. The contact ring 60 includes an extending tab 64, and the contact ring 62 includes an extending tab 66. The tabs 64 and 66 are connected to the respective wires 56 and 54 to complete an electrical circuit to the light source 48. The contact disk 58 forms a rotatable segment for supplying power to the light source 48.

A stationary segment for providing power to the light source 48 comprises respective spring-loaded conductors 68 and 70 which bear on the contact rings 60 and 62. The conductor 68 is connected to a wire 72, while the conductor 70 is connected to a wire 74. The wires 72 and 74 lead to a source of electrical energy (not illustrated), and preferably extend through the arms of the support system 22 to that electrical source. Thus, electrical energy is provided to the light source 48 via the wires 72 and 74 connected to the conductors 68 and 70, which bear on the contact rings 60 and 62. The contact rings 60 and 62 are, in turn, connected to the wires 56 and 54 leading to the light source 48. While simply for the purposes of illustration, the wires 72 and 74 are shown extending in a straight direction, as indicated above, it is preferred that the wires extend within the head 18 and continue through the support system 22 to the appropriate and conventional source of electrical energy for energizing the light source 48.

The rotatable contact disk 58 and conductors 68 and 70 form what is often called a slip ring connection. It will be evident that other connections could be provided, so long as the non-rotatable head 18 can supply power to the rotatable light source 48 in the roller tube 16.

Until the flexible canopy 14 is unfurled from the roller tube 16, the light source 48 is enveloped within the flexible canopy and thus, even if energized, would provide little or no light beneath the flexible canopy 14. However, once the awning 12 is fully extended with the flexible canopy 14 completely reeled from the roller tube 16, and given the geometry of the roller tube 16 with the flexible canopy installed in the slots 26 and 28, once the flexible canopy 14 has fully unfurled, the slot 30 is aimed into the living space beneath the flexible canopy 14. Thus, once the light source 48 is energized, the area beneath the flexible canopy 14 will be lit.

Various changes may be made to the invention without the departing from the spirit thereof or scope of the following claims.

What is claimed is:

1. A retractable awning movable between an extended position and a retracted position, the awning comprising:
   a roller tube;
   a flexible canopy rollable onto and unrollable from said roller tube;
   an elongated, electric light source mounted on said roller tube, said light source electrically connected to a first electrical coupler;
   first and second heads configured for supporting said roller tube;
   said first head comprising an axle mounted for rotation therein and extending therefrom, said axle configured for fixed engagement with said roller tube, said first head further comprising a contact disc configured for rotation with said axle, said contact disc comprising a first contact ring;
   a first wire connected at one end to said first contact ring and at another end to a second electrical coupler, said first wire and said second electrical coupler extending from said first head;
   said second electrical coupler engagable with said first electrical coupler when said roller tube is connected to said axle.

2. The awning of claim 1, said roller tube fixedly connected to said axle.

3. The awning of claim 2, said first electrical coupler engaged with said second electrical coupler.

4. The awning of claim 3 attached to a recreational vehicle.

5. The awning of claim 4, said awning defining a space below said flexible canopy when said awning is extended and said light source configured to illuminate said space below said flexible canopy when said awning is extended.

6. The awning of claim 3, wherein said first coupler and second coupler rotate about an exterior of said axle when said canopy is rolled onto or unrolled from said roller.

7. The awning of claim 1, said first electrical coupler and said second electrical coupler external to said axle.

8. The awning of claim 1, said contact ring further comprising a second contact disc, and a second wire connected at one end to said first second contact ring and at another end to said second electrical coupler.

* * * * *